United States Patent Office 2,816,084
Patented Dec. 10, 1957

2,816,084

COATING COMPOSITIONS CONTAINING AN EPOXY RESIN, A METHYLOL SUBSTITUTED 2-ALKENYLOXYBENZENE, AND A BUTYLATED UREA-FORMALDEHYDE RESIN

Louis J. Nowacki, Bexley, Ohio, assignor, by mesne assignments, to Synthetasine Protective Coatings, Inc., New York, N. Y., a corporation of Delaware No Drawing. Application May 3, 1952,
Serial No. 286,011

6 Claims. (Cl. 260—45.1)

This invention relates to new coating compositions which are particularly advantageous for coating steel containers, giving coatings which show excellent flexibility, adhesion, and reverse-impact resistance, resistance to corrosive chemicals, etc.

The new coating compositions are made with a combination of an epoxide resin and a special unsaturated liquid phenolic resin, and advantageously, also with a small amount of a butylated urea formaldehyde resin.

The epoxide resins are resinous polyepoxides resulting from the reaction of dihydric phenols, epichlorhydrin and alkali, or from the direct addition reaction of dihydric phenols and aliphatic diepoxides, which resins have terminal aliphatic epoxide groups and are free from reactive groups other than epoxide and aliphatic hydroxyl groups, and having the following general formula:

$$R_1-(O-R-O-R_2)_n-O-R-O-R_1$$

in which R is the residue of the dihydric phenol, $R_2$ is an aliphatic radical containing at least one aliphatic hydroxyl group and $R_1$ is a terminal aliphatic radical containing a terminal epoxide group and $n$ indicates the degree of polymerization.

Epoxide resins which are particularly advantageous for use in the new compositions are resins resulting from the reaction of bis-phenol, epichlorhydrin and alkali, such as sold under the trade name "Epon" by the Shell Chemical Corporation, having the following typical structure:

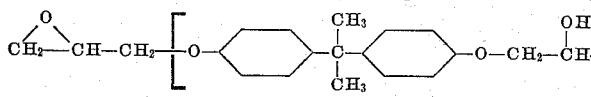

These "Epon" resins have reactive hydroxyl and epoxy groups and vary in their melting point and epoxide equivalent, e. g., a resin melting at 64–76°, having an epoxide equivalent (grams of resin containing 1 equivalent of epoxide) of 450–525 (Epon 1001); a resin melting at 97–103, having an epoxide equivalent of 905–985 (Epon 1004); a resin melting at 127–133, having an epoxide equivalent of 1600–1900 (Epon 1007); and a resin melting at 145–155, having an epoxide equivalent of 2400–3000 (Epon 1009); etc.

The special unsaturated liquid phenolic resin is an unsaturated ether of a methylol phenol and has a composition corresponding to the general formula

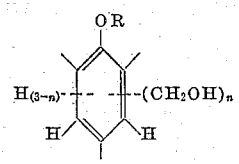

where $n$ is an integer from 1 to 3 inclusive, and R represents an organic radical derived from the class of compounds containing a reactive

group such a vinyl, allyl, methylallyl, cyclopentenyl, cyclohexenyl, styryl, etc., as well as halogenated derivatives of the aforementioned groups. These resinous compounds are described more fully in U. S. Patents 2,579,329, 2,579,330, and 2,579,331.

Particularly advantageous unsaturated liquid phenolic resins are the unsaturated ethers of tris-(hydroxy methyl) phenol having the general formula

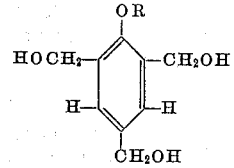

in which R is an unsaturated aliphatic radical, and particularly the allyl radical or group, i. e., the allyl ether of tris-(hydroxy methyl) phenol, as described in said patents. This resin, the allyl ether of tris-(hydroxy methyl) phenol may vary somewhat in its properties and may contain small and varying amounts of the allyl ether of monohydroxy methyl phenol and dihydroxy methyl phenol.

Such a liquid unsaturated phenolic resin is the resin sold under the trade name "R-108," by the General Electric Company, which is a commercial allyl ether of tris-(hydroxy methyl) phenol. It has a density of around 1.15 to 1.25; a solidifying point below −50° F.; a boiling range which begins at approximately 400° F. with simultaneous polymerization; a molecular weight of approximately 200, which is soluble in polar solvents, and has a viscosity of 2,000–4,000 cps. at 25° C. This resin is an intermediate resin distinguished from other phenolic resins in that it produces cured films when baked, which have remarkable resistance to alkali. Its low molecular weight and unsaturated aliphatic group allows more reactivity with the epoxide resins than other known phenolic resins.

The proportions of the epoxide resin and of the special unsaturated phenolic resin can be varied, e. g., within the range of from 2 parts by weight of the special unsaturated phenolic resin to 8 parts by weight of the epoxide resin, to 8 parts by weight of the special unsaturated phenolic resin to 2 parts by weight of the epoxide resin.

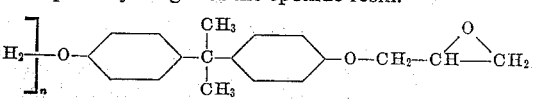

There is also advantageously used in the new resin composition, a butylated urea formaldehyde resin such as the butylated urea formaldehyde-type resin sold under the trade name "Uformite F-240" by the Resinous Products & Chemical Company. Such resin in the form of a solution containing 60% solids in a solvent made up of 40% xylol and 60% butanol has a specific gravity of about 1.02 and an acid number of 3–8. Such butylated urea formaldehyde resin is advantageously used as a curing catalyst in amount varying from 2 to 20%.

The use of butylated urea formaldehyde resin as a curing catalyst is particularly advantageous because it also eliminates the phenomenon commonly known to the paint trade as "cratering" or "eyeholing," which occurs when other curing catalysts are used. "Craters" or "eyeholes" are randomly dispersed circular depressions (or even holes) in the coating film.

The invention will be further illustrated by the following specific examples, but it will be understood that the invention is not limited thereto.

*Example 1*

A solution is first made containing 355.3 pounds of an epoxide resin melting at 127–133°, and having an epoxide equivalent of 1600–1900 ("Epon 1007"), and 88.9 pounds of a butylated urea formaldehyde resin solution ("Uformite F-240," 60% solids) in 355.3 pounds of methyl isobutyl ketone. This gives 100 gallons of a solution of epoxide and butylated urea formaldehyde resins.

207.4 pounds of titanium dioxide pigment are made into a paste with 113 pounds (14.12 gallons) of the above solution by grinding on a three-roll mill.

To 518.5 pounds (63.63 gallons) of the above resin solution is added 152.6 pounds (15.87 gallons) of the special unsaturated phenolic resin ("R-108," General Electric Company) to give 79.5 gallons of solution containing all three resins. The pigment paste is then admixed with the resin solution to give a pigmented coating composition.

The above resin solution without the admixed pigment, or the pigmented composition, can be further diluted by the addition of methyl isobutyl ketone, adding 1 volume of solvent to 1 volume of resin solution to give a coating composition suitable for application for spraying.

When the above composition is used to coat metals, the curing of the composition is accomplished by baking, e. g., 30 minutes at 400° F., or 15 minutes at 450° F. Where two coats are applied, the first coat is baked, e. g., for 5 minutes at 450° F., or 10 minutes at 400° F., and the second coat baked as above indicated.

The foregoing example illustrates the use of the resins without the pigment and also the use of the pigmented resins. Other pigments, other than titanium dioxide, can be used.

The composition of the above example gives a coating which combines excellent flexibility, adhesion, and reverse-impact resistance with outstanding resistance to many corrosive chemicals to a higher degree than any previously known coating composition. When a drum is coated with the composition and the composition cured, flanges can be inserted into the coated drum shell (made of clean cold-rolled steel) with little or no cracking of the coating. Striking repeated blows on the outside of the shell of such a drum with a ball-peen hammer does not crack the coating nor does a 60-inch-pound blow struck on a ¾-inch-diameter rounded tip in contact with the uncoated side of a 22-gauge cold-rolled steel test panel cause any cracking or flaking of the coating.

*Example 2*

A mixture of 32.1 parts by weight of the liquid unsaturated phenolic resin of Example 1, 59 parts of the complex epoxy resin of Example 1, and 8.9 parts parts of the butylated urea formaldehyde resin of Example 1 was dissolved in methyl isobutyl ketone to give a solution containing 60% nonvolatile constituents.

*Example 3*

A solution produced in accordance with Example 2 is pigmented by the addition of 30 parts of titanium dioxide.

*Example 4*

The resin mixture of Example 2 was dissolved in a solvent made up of 90% methyl ethyl ketone and 10% of glycerol monoethyl ether ("Cellosolve") to give a solution containing 60% nonvolatile and then pigmented with 5.6 parts of carbon black

*Example 5*

The solution of Example 4 was pigmented with 17.5 parts iron oxide and 7.5 parts zinc chromate, instead of 5.6 parts of carbon black.

*Example 6*

The solution of Example 4 was pigmented with 13.2 parts iron oxide, 5.3 parts zinc chromate, and 5.8 parts mica, instead of the carbon black pigment.

*Example 7*

The solution of Example 4 was pigmented with 20 parts aluminum powder instead of 5.6 parts of carbon black.

*Example 8*

A mixture of 40 parts by weight of the special unsaturated phenolic resin of Example 1, 57 parts of the complex epoxy resin of Example 1, and 3 parts of the butylated urea formaldehyde resin of Example 1 was dissolved in a solvent composed of 90% methyl ethyl ketone and 10% of glycol monoethyl ether ("Cellosolve") to give a solution containing 60% nonvolatile constituents.

*Example 9*

A mixture of 60 parts by weight of the unsaturated phenolic resin of Example 1, 36 parts of the complex epoxide resin of Example 1, and 4 parts of the butylated urea formaldehyde resin of Example 1 was dissolved in a solvent composed of 90% methyl ethyl ketone and 10% of glycol monoethyl ether ("Cellosolve") to give a solution containing 40% solvent and 60% nonvolatile.

*Example 10*

A mixture of 32.1 parts by weight of the unsaturated phenolic resin of Example 1, 59 parts of the complex epoxy resin of Example 1, and 8.9 parts of the butylated urea formaldehyde resin of Example 1 was dissolved in 59 parts methyl isobutyl ketone and 21 parts methyl ethyl ketone. 43.5 parts of titanium dioxide pigment was dispersed in the resin solution by grinding the entire mixture in a pebble mill.

*Example 11*

A mixture of 40 parts by weight of the unsaturated phenolic resin of Example 1, 57 parts of the complex epoxy resin of Example 1, and 3 parts of the butylated urea formaldehyde resin of Example 1 was dissolved in 59 parts of methyl isobutyl ketone and 21 parts of methyl ethyl ketone. 21.5 parts of titanium dioxide was dispersed in the resin solution by grinding the entire mixture in a pebble mill.

The compositions made according to the above examples are concentrated solutions or compositions which can be marketed and shipped in that form or further diluted before shipment. For use as spraying compositions, they are further diluted with a solvent to spraying viscosity, using the same solvent used in the original solutions. They are applied by spraying and by baking, e. g., one-half hour at 400° F. to produce coatings of around 0.5 to 3.0 mils in thickness.

The compositions can also be prepared for application by roller coating or brushing by selecting solvents which evaporate more slowly than those used in the spraying formulas.

The coatings are characterized by excellent resistance to a wide variety of chemicals such as alkalies, acids, detergents, polar and nonpolar solvents, chlorinated solvents, etc., and are in addition, highly flexible, adherent and resistant to reverse impact. Coatings made with the compositions of Examples 2 and 3 were tested in a boiling 50% caustic alkali solution for one hour without visible damage.

Instead of the particular epoxide resin used in the above examples, other epoxide resins varying somewhat in melting point and epoxide equivalent can similarly be used. Instead of the particular phenolic resin used in the above examples, other unsaturated ethers of methylol phenols and particularly of tris-(hydroxy methyl) phenol can similarly be used. Other butylated urea formaldehyde resins can be used other than that of the above examples.

When the butylated urea formaldehyde catalysts are used, the coating compositions are stable for long periods of time, but effectively convert on baking to form infusible reaction products.

This application is a continuation-in-part of my prior application, Serial No. 223,133, filed April 26, 1951, and now abandoned.

I claim:

1. A composition comprising a mixture of (1) an epoxide resin, which is a condensate of epichlorohydrin and a dihydric phenol, (2) an alkenyloxybenzene from the group consisting of allyloxybenzene and methallyloxybenzene, said alkenyloxybenzene containing 3 methylol groups linked singly at the 2, 4 and 6 positions on the benzene ring, in proportions of 2 to 8 parts of (1) to 8 to 2 parts by weight of (2), and (3) from 2 to 20%, based on the other resins, of a butylated urea formaldehyde resin.

2. The method of coating metal surfaces which comprises applying to such surfaces a solution of the resin composition of claim 1 and baking the coating to convert it into an insoluble coating.

3. Coated articles coated by the process of claim 2.

4. A coating composition containing a liquid unsaturated phenolic resin which is a 2-alkenyloxybenzene containing 1 to 3 methylol groups linked singly at the 2, 4 and 6 positions on the benzene ring, an epoxy resin which is a polymeric polyether derivative of a dihydric phenol having terminal epoxide groups and at least one intermediate aliphatic hydroxyl group, in the proportions of from 2 to 8 parts by weight of phenolic resin and 8 to 2 parts by weight of the epoxide resin, and which also contains from 2 to 20%, based on the other resins, of a butylated urea formaldehyde resin.

5. The method of coating metal surfaces which comprises applying to such surfaces a solution of the resin composition of claim 4 and baking the coating to convert it into an insoluble coating.

6. Coated articles coated by the process of claim 5.

References Cited in the file of this patent

UNITED STATES PATENTS

| | | |
|---|---|---|
| 2,528,359 | Greenlee | Oct. 31, 1950 |
| 2,579,329 | Martin | Dec. 18, 1951 |
| 2,606,935 | Martin | Aug. 12, 1952 |
| 2,774,748 | Howard et al. | Dec. 18, 1956 |

FOREIGN PATENTS

| | | |
|---|---|---|
| 257,115 | Switzerland | Mar. 16, 1949 |

OTHER REFERENCES

Renfrew et al., "Coatings of Polyamide and Epoxy Resin Blends," Ind. Eng. Chem., volume 46, No. 10, October 1954, page 2228.

"The Condensed Chemical Dictionary," published by Reinhold Pub. Corp., 5th edition (1956), page 137.